(12) United States Patent
Wertheim et al.

(10) Patent No.: US 8,159,752 B2
(45) Date of Patent: Apr. 17, 2012

(54) WIDE FIELD OF VIEW COVERAGE HEAD-UP DISPLAY SYSTEM

(75) Inventors: Hagai Wertheim, Haifa (IL); Guy Kaufman, Haifa (IL); Erikos Amarilio, Haifa (IL)

(73) Assignees: Elbit Systems Ltd. (IL); Elbit Systems Electro-Optics ELOP Ltd. (IL)

( * ) Notice: Subject to any disclaimer, the term of this patent is extended or adjusted under 35 U.S.C. 154(b) by 160 days.

(21) Appl. No.: 12/537,784

(22) Filed: Aug. 7, 2009

(65) Prior Publication Data
US 2010/0060990 A1    Mar. 11, 2010

(30) Foreign Application Priority Data
Aug. 7, 2008   (IL) .......................................... 193326

(51) Int. Cl.
   *G02B 27/14*   (2006.01)
(52) U.S. Cl. ........................................ 359/632; 359/630
(58) Field of Classification Search ........... 359/630–633
   See application file for complete search history.

(56) References Cited

U.S. PATENT DOCUMENTS

| | | | |
|---|---|---|---|
| 3,945,716 A | 3/1976 | Kinder | |
| 4,962,998 A * | 10/1990 | Iino | ............................. 359/630 |
| 5,034,732 A | 7/1991 | Iino | |
| 2005/0206727 A1 | 9/2005 | Kormos | |
| 2007/0030174 A1 * | 2/2007 | Randazzo et al. | ............ 340/979 |

OTHER PUBLICATIONS

Search Report Published with Publication of the European Patent Application No. EP 2151382 A1, the Application Serial No. 09009978.9, published Feb. 10, 2010.

* cited by examiner

*Primary Examiner* — James Greece

(57) ABSTRACT

Head-up display scenery alignment system, the head-up display being mounted in an aircraft and including an image projector and a combiner. The combiner is optically located between a user and a scenery of interest, optically transmitting a scene image of the scenery of interest to the user. The image projector projects an image toward the combiner, and the combiner reflects the image toward the user. The aircraft includes a heading angle sensor, determining the heading angle of the aircraft. The HUD scenery alignment system includes a moving mechanism coupled with the combiner; and a processor coupled with the heading angle sensor, with the moving mechanism and with the projector. The processor receives heading angle information from the heading angle sensor, and the processor determines the deviation of the heading of the aircraft from the longitudinal axis of the aircraft according to the heading angle information. The processor directs the moving mechanism, according to the deviation, to move the combiner to a position which is located between the scenery of interest and the user and which aligns the reflection of the image toward the user, with the scene image.

11 Claims, 14 Drawing Sheets

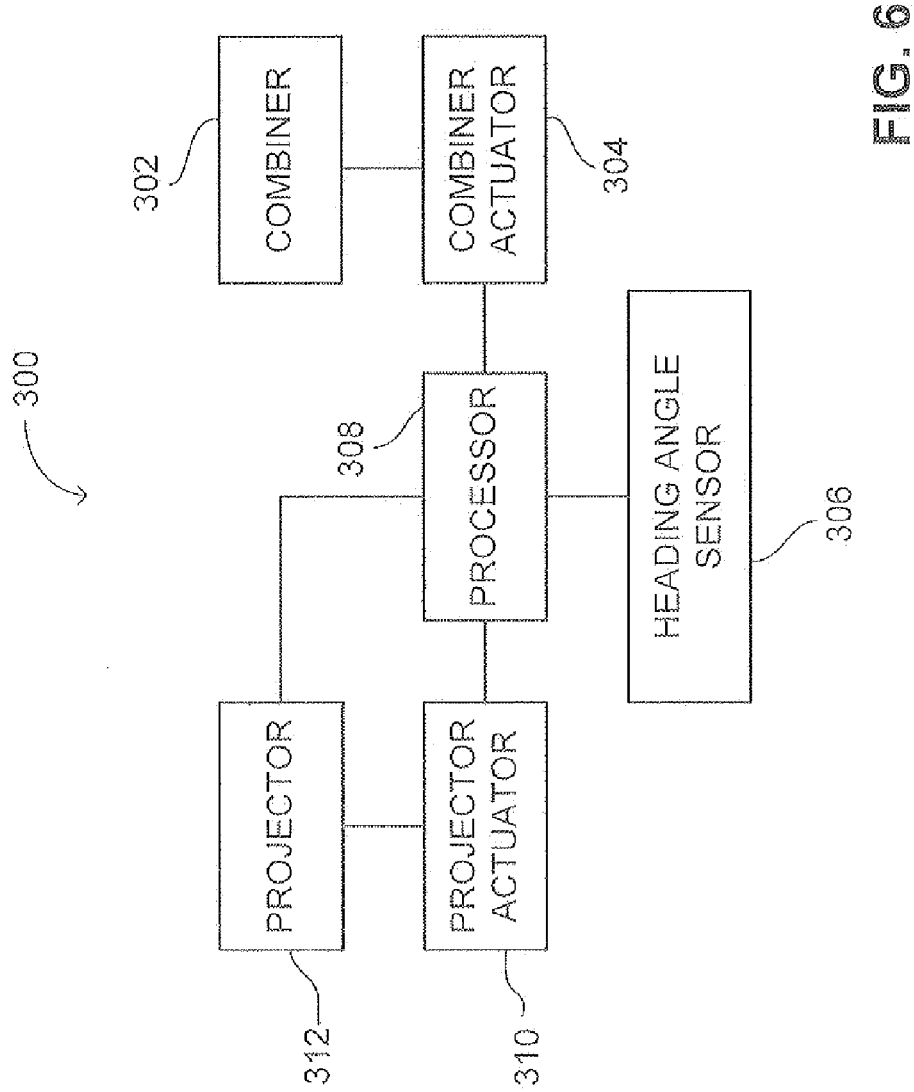

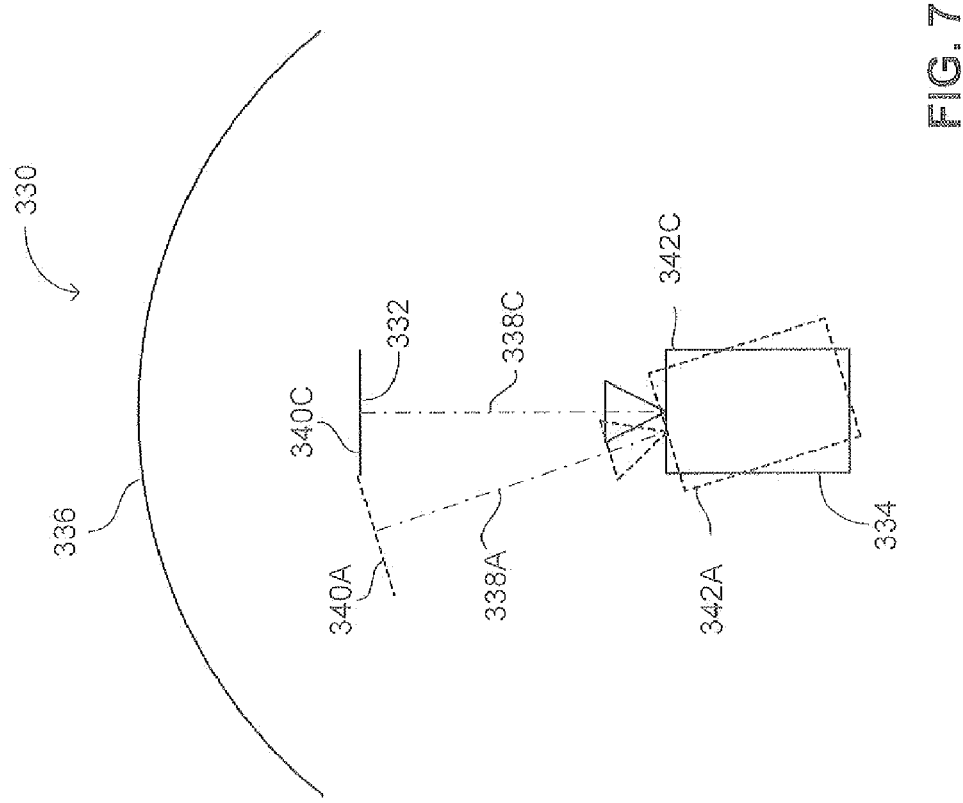

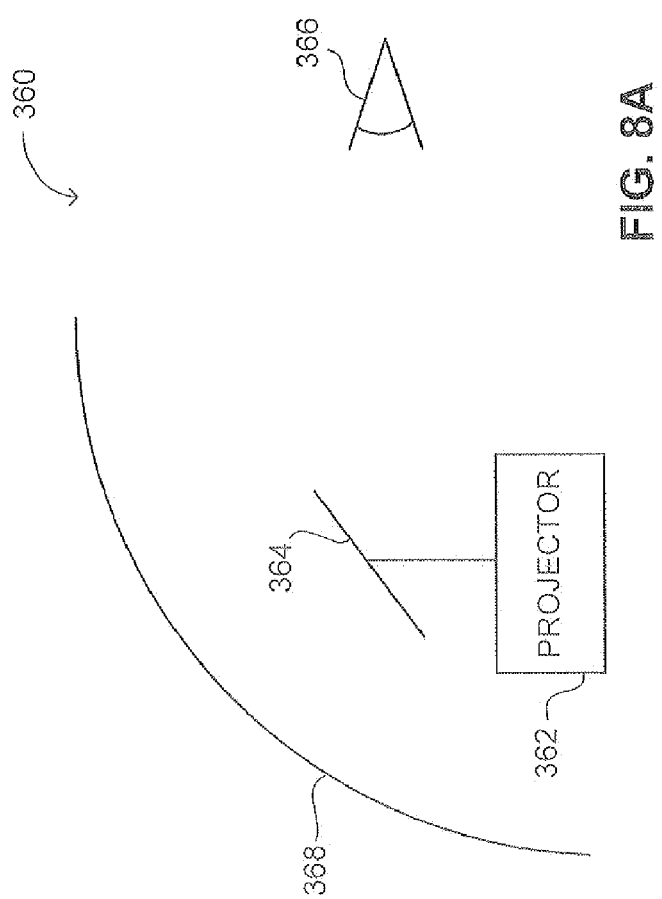

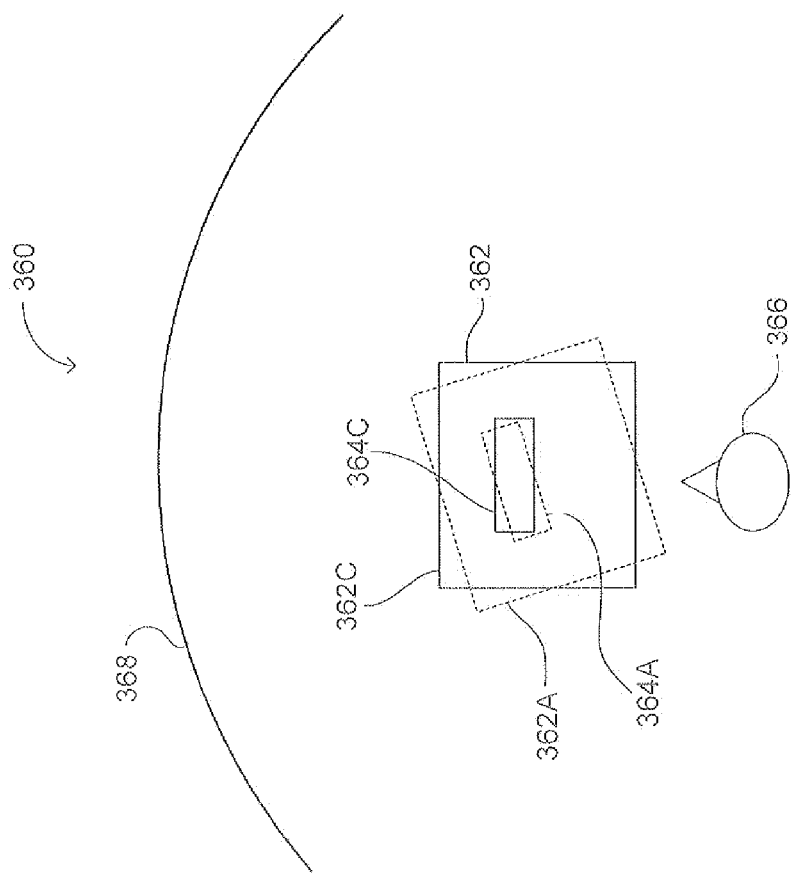

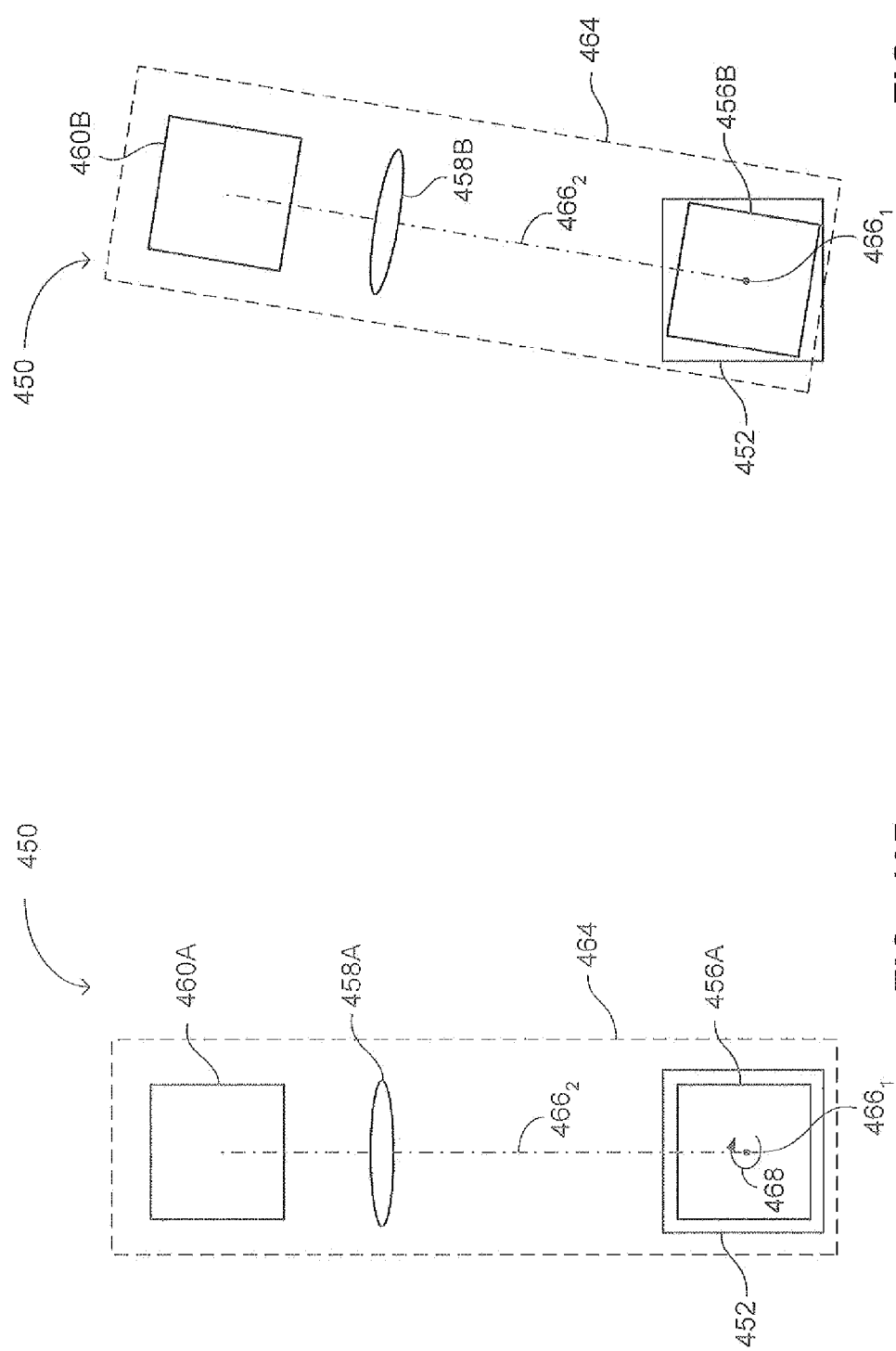

WIDE FIELD OF VIEW COVERAGE HEAD-UP DISPLAY SYSTEM

CROSS-REFERENCE TO RELATED APPLICATION

This application claims priority to Israel Patent Application No. 193326 filed on Aug. 7, 2008, the disclosure of which is incorporated herein by reference to the extent permitted by law.

FIELD OF THE INVENTION

The disclosed technique relates to display systems, in general, and to head-up see-through displays, in particular.

BACKGROUND OF THE INVENTION

Head-up displays (HUDs) are known in the art. Such display systems may be used in a variety of different applications such as in military, civil aviation and automotive applications.

A typical HUD includes a data processing unit, an optical projector unit (OPU) (herein below referred to as "projector"), and a see-through display, which is commonly known as a combiner. The projector includes an image source (such as a cathode ray tube (CRT) and a Liquid Crystal Display (LCD)) and optics. The optics includes a set of lenses (e.g., a refractive or diffractive lens) and mirrors, to display the information generated by the image source on the combiner. The combiner allows the user to view the displayed information (e.g., the altitude, airspeed and heading of an aircraft), while maintaining external situational awareness. The displayed information is consisted of computer generated graphics and video images and is herein below referred to as "image". Thus, the image is combined with the ambient scenery, enabling the user to view both the image and the ambient scene simultaneously. Usually, the projected image appears superimposed onto an image from the ambient scene.

HUD systems may be divided to two types: fixed HUDs, which are fixed to a chassis (such as an airframe of an aircraft, or a chassis of a vehicle), and helmet-mounted or head-mounted HUDs. Fixed HUD systems usually include a combiner, which is rigidly fixed.

Reference is now made to FIGS. 1A and 1B. FIG. 1A is a schematic illustration of a horizontal cross section of an aircraft which includes a fixed Head-up Display system (not shown), as known in the art, while the aircraft is approaching a runway in calm weather. FIG. 1B is a schematic illustration of a horizontal cross section of the aircraft of FIG. 1A, flying against a side wind blowing toward the aircraft, from left of the aircraft.

With reference to FIG. 1A, the fixed Head up Display system includes a combiner 58, which is rigidly fixed to an aircraft 54. A longitudinal axis 60 of aircraft 54 is in line with a heading vector 62 of aircraft 54. During the landing of aircraft 54, a pilot 56 of aircraft 54 flies aircraft 54, such that heading vector 62 is in line with an approach line 64 of a runway 52. As used herein, a horizontal axis of a combiner is defined by a line crossing the combiner, which is substantially parallel to the horizontal plane of the aircraft. A horizontal axis 66 of combiner 58 is perpendicular to longitudinal axis 60 and therefore perpendicular to heading vector 62. Therefore, pilot 56 is able to view the image projected by the fixed Head up Display system on combiner 58, along with the ambient scenery (i.e., runway 52).

With reference to FIG. 1B, due to side wind, indicated by arrows 70, longitudinal axis 60 is tilted relative to heading vector 62. However, pilot 56 still maintains heading vector 62, in line with approach line 64. In this case, horizontal axis 66 of combiner 58 is no longer perpendicular to heading vector 62. Consequently, pilot 56 is unable to view runway 52, through combiner 58. Consequently, the image projected by the system on combiner 58 is at least not properly superimposed on the image of runway 52.

U.S. Pat. No. 3,945,716 issued to Kinder and entitled "Rotatable Head Up Display with Coordinate Reversal Correctives," is directed to a rotatable head up display system for use as a visual aid for target acquisition and weapon delivery by a pilot from an aircraft. The system includes a head up display arm pivotally mounted to the aircraft, an image projecting means (a CRT unit), which is mounted on the arm, a CRT control unit which contain the CRT unit or controls the CRT unit, and a display plate (or a screen or a holographic lens), which is depending from the arm into a normal field of view of the pilot. The image projecting means projects images onto the display plate. The system further includes a sensor for acquiring and tracking a target, and for transmitting images to the projecting means, while the CRT control unit automatically positions the arm in response to and in coordination with movement of the sensor. The sensor may be moved through automatic sensor control or through a manual controller by a joystick. Thus, the projecting means and the display plate are repositioned and presented substantially along the azimuth of the target.

US Patent Application Publication No. 2005/0206727 to Kormos and entitled "Systems and Method for Forming Images for Display in a Vehicle" is directed to an auxiliary vision system, which forms images for display in land vehicles, and particularly applicable during night time. The system includes a head up display unit, a camera unit, a computer, and one or more sensors, such as an angular encoder. The sensors provide information regarding the heading of the vehicle. The sensors are coupled to a steering column of the vehicle or to an inclinometer which is coupled to a chassis of the vehicle. The sensors may be replaced by image processing software embedded within the computer. The head up display unit includes a liquid crystal display (LCD), a mirror, a drive mechanism and a circuitry. The camera unit includes a lens system, a chopper (which may be omitted in some embodiments), a detector and a circuitry. The detector includes a two-dimensional matrix of detector elements, where each detector element produces a respective pixel of a resulting image. The camera unit is electrically coupled to the head up display unit and to the computer. The computer is electrically coupled to one or more of the sensors. The head up display unit is mounted to the vehicle and projects images onto the inside surface of the windshield for display to a driver. The lens system directs the incoming radiation onto an image plane of the detector. The chopper periodically permits and prevents the travel of incoming infrared radiation to the detector. The circuitry of the camera unit controls the detector, reads out the images it detects, and synchronizes the chopper to the operation of the detector. Furthermore, based on information from the computer, the circuitry sends the information obtained from the detector through the electrical coupling to the circuitry within the display unit. The computer provides instructions to the camera unit based on the heading information it receives from the sensors. Using the heading information, the computer selects the detector elements of the detector for which the associated information should be used, to form an image by the head up display unit. The computer furthermore, sends appropriate instructions regarding these detector elements to the circuitry of the camera unit, which receives the instructions regarding the selected detector elements, and sends the information associated with each selected detector element to the head up display unit. The circuitry of the display unit takes successive images obtained from the detector through the circuitry of the camera unit, and presents them on the LCD. The LCD image is projected onto the mirror that reflects the image which is directed onto the inner surface of the windshield, thus creating a virtual image for the driver. The mirror is movably supported, and its position in any given time is supported by the drive mechanism. Using the drive mechanism, the driver may adjust the mirror so that the image on the windshield is in a viewing position comfortable for the driver. Once the driver has finished adjusting the mirror to a suitable position, it remains in that position during normal operation of an auxiliary vision system.

SUMMARY OF THE INVENTION

It is an object of the disclosed technique to provide a novel method and system for aligning a Head-Up Display (HUD) image with a scene image, by employing a moveable optical combiner.

In accordance with the disclosed technique, there is thus provided a HUD scenery alignment system, the HUD being mounted in an aircraft and including an image projector and a combiner. The combiner is optically located between a user and a scenery of interest, optically transmitting a scene image of the scenery of interest to the user. The image projector projects an image toward the combiner, which reflects the image toward the user. The aircraft includes a heading angle sensor, determining the heading angle of the aircraft. The HUD scenery alignment system includes a moving mechanism coupled with the combiner; and a processor coupled with the heading angle sensor, with the moving mechanism and with the projector.

The processor receives heading angle information from the heading angle sensor, and determines the deviation of the heading of the aircraft from the longitudinal axis of the aircraft according to the heading angle information. The processor directs the moving mechanism, according to the deviation, to move the combiner to a position which is located between the scenery of interest and the user and which aligns the reflection of the image toward the user, with the scene image.

BRIEF DESCRIPTION OF THE DRAWINGS

The disclosed technique will be understood and appreciated more fully from the following detailed description taken in conjunction with the drawings in which:

FIG. 6 is a schematic illustration of a HUD system, constructed and operative in accordance with a further embodiment of the disclosed technique;

FIG. 7 is a schematic illustration of a moveable HUD system, constructed and operative in accordance with another embodiment of the disclosed technique;

FIG. 8A is a schematic illustration of a side view of a moveable HUD system, constructed and operative in accordance with a further embodiment of the disclosed technique;

FIG. 8B is a schematic illustration of a horizontal cross-section of the system of FIG. 8A;

FIG. 10B is a front view schematic illustration of the HUD system of FIG. 10A; and FIG. 10C is a front view schematic illustration of the HUD system of FIG. 10A, in which the combiner, the optical assembly and the folding mirror are rotated clockwise.

DETAILED DESCRIPTION

The disclosed technique overcomes the disadvantages of the prior art by providing a wide field of view Head-Up Display (HUD) system employing a moveable combiner, in order to align the combiner with respect to the heading of the aircraft, while adjusting the projection of the HUD image, accordingly. The aligned position of the combiner aligns the reflection of the projected image toward a user, with a scene image. Thus, the disclosed technique provides the pilot with a wider total field of view (TFOV), which enables the pilot to view the projected image superimposed on scenery of interest in different flight conditions. For example, the pilot is able to view the projected image superimposed on a scenery heading the flight, even in case the longitudinal axis of the aircraft is tilted in relation to the heading of the flight, (e.g., by a side wind).

A default combiner position is the position of a combiner within an aircraft, allowing the pilot to view a projected image superimposed on scenery of interest, while a longitudinal axis of the aircraft is inline with the heading vector of the aircraft. In case of fixed HUDs, the combiner is generally located at such a position that a horizontal axis of the combiner is approximately perpendicular to the longitudinal axis of the aircraft. Thus, herein below, "default combiner position" is referred to, but not limited to, a combiner position in which a horizontal axis of the combiner is perpendicular to a longitudinal axis of the aircraft.

Figure 1A:
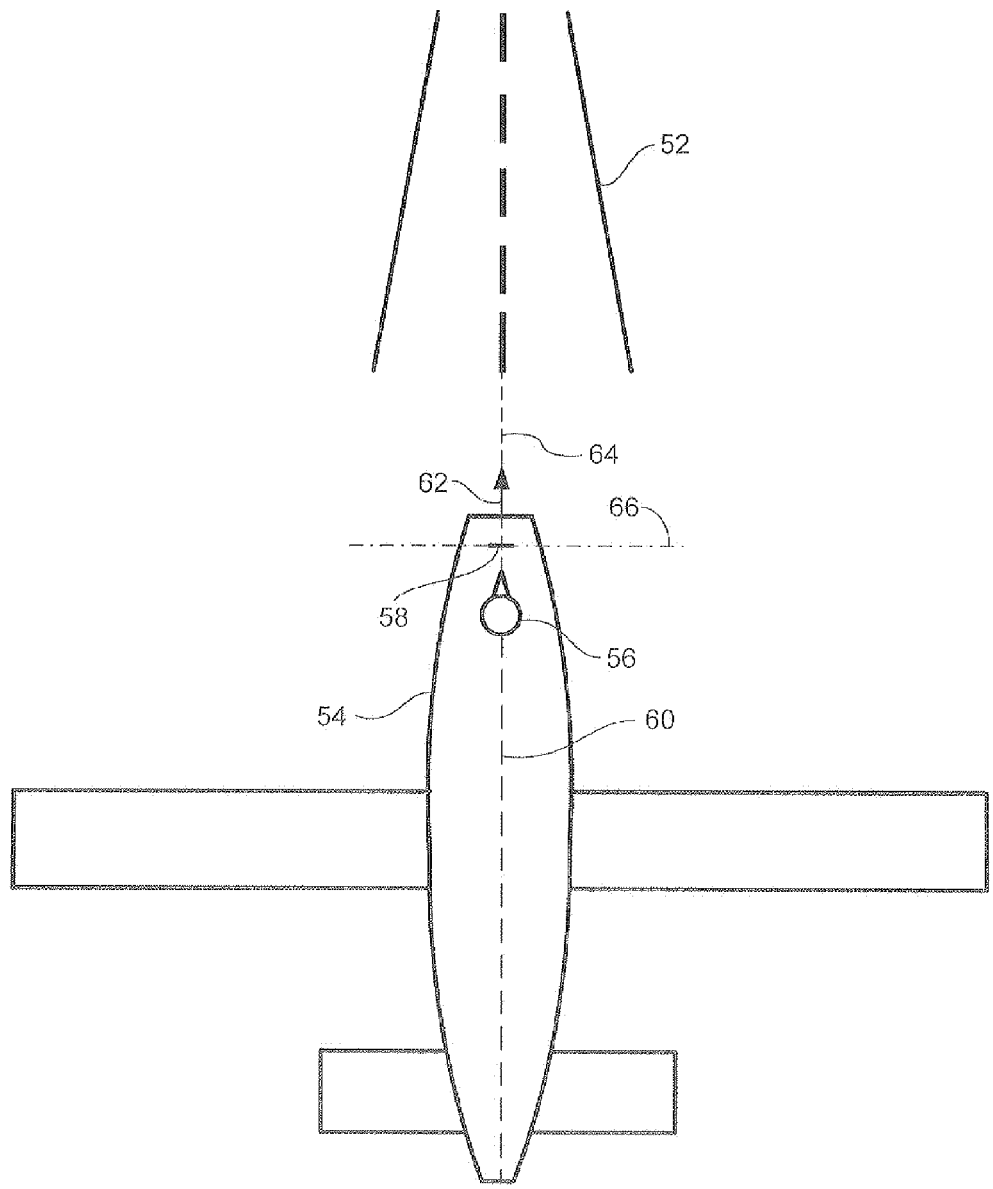
FIG. 1A is a schematic illustration of a horizontal cross section of an aircraft which includes a fixed Head-Up Display system, as known in the art, while the aircraft is approaching a runway in calm weather.
Figure 1B:
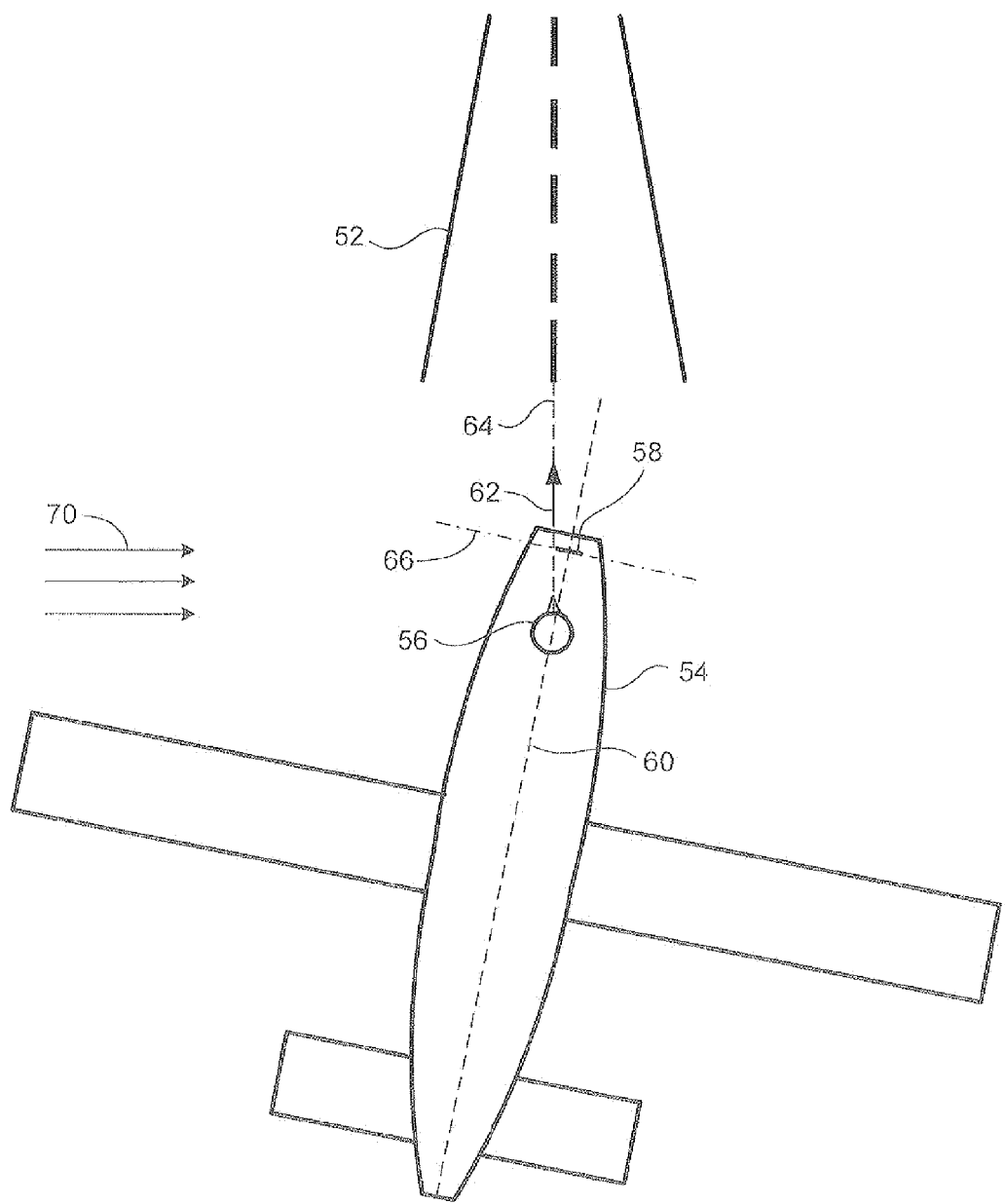
FIG. 1B is a schematic illustration of a horizontal cross section of the aircraft of FIG. 1A, flying against a side wind blowing toward the aircraft, from left of the aircraft.
Figure 2A:
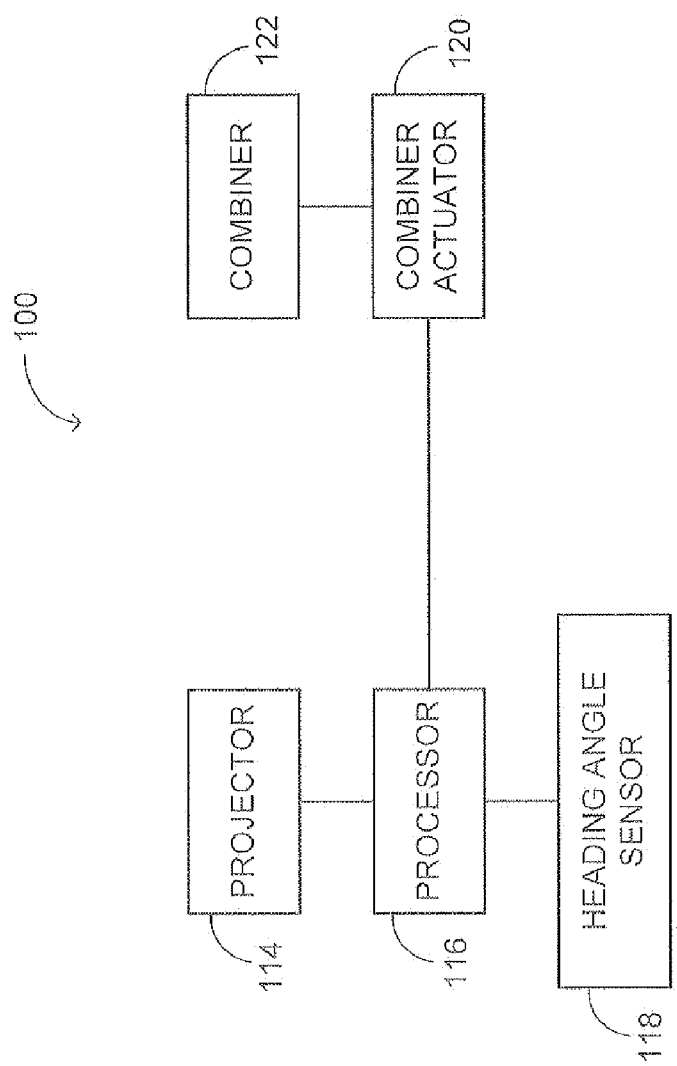
FIG. 2A is a schematic illustration of a system, constructed and operative in accordance with an embodiment of the disclosed technique.
Figure 2B:
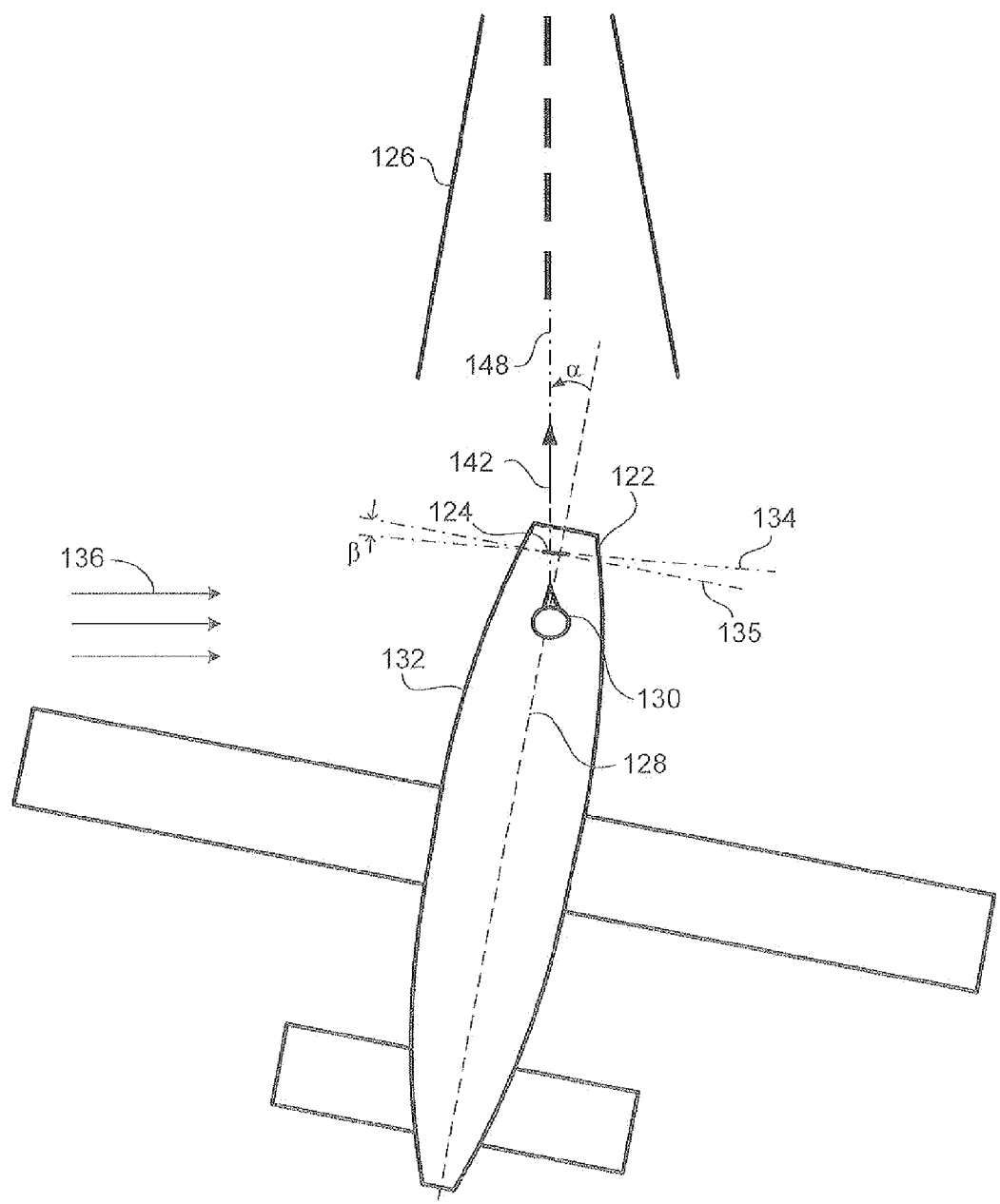
FIG. 2B is a schematic illustration of a horizontal cross section of an aircraft approaching a runway against a side wind blowing toward the aircraft, from left of the aircraft, and employing the system of FIG. 2A.

Reference is now made to FIGS. 2A and 2B. FIG. 2A is a schematic illustration of a system, generally referenced 100, constructed and operative in accordance with an embodiment of the disclosed technique. FIG. 2B is a schematic illustration of a horizontal cross section of an aircraft approaching a runway against a side wind blowing toward the aircraft, from left of the aircraft, and employing the system of FIG. 2A.

With reference to FIG. 2A, system 100 includes a projector 114, a processor 116, a heading angle sensor 118, a combiner actuator 120 and a combiner 122. Projector 114 includes an image source (not shown) and an optical assembly (not shown). Combiner actuator 120 includes a plurality of controlled powered mechanisms (not shown). Combiner actuator 120 is a moving mechanism, which may be, for example, a rotary actuator, an extending rotating arm, an angular rail, and the like.

Processor 116 is coupled with heading angle sensor 118, projector 114, and with combiner actuator 120. Combiner actuator 120 is coupled with combiner 122. Heading angle sensor 118 is a device which determines a heading angle (not shown), which is the angle between a heading vector 142 (FIG. 2B, i.e., a direction of flight of an aircraft 132) and a longitudinal axis 128 of aircraft 132 (FIG. 2B). Horizontal heading angle is the horizontal projection of the heading angle, with respect to a horizontal plane of aircraft 132 (FIG. 2B). It is noted that horizontal heading angle may be determined by heading angle sensor 118 or by processor 116. It is further noted, that heading angle sensor 118 may include one or more location and orientation sensors (i.e., position sensors, not shown). Alternatively, heading angle sensor 118 may be coupled with a global positioning system (GPS, not shown) and an inertial navigation system (INS, not shown) of aircraft 132.

Projector 114 projects an image (not shown) on combiner 122. The image source generates the image, and the optical assembly directs the image toward combiner 122. Combiner actuator 120 is a moving mechanism operative to receive commands from processor 116 and translate the commands to spatial movements.

Processor 116 receives heading angle information from heading angle sensor 118. Processor 116 determines the deviation of the heading of the aircraft from the longitudinal axis of the aircraft, according to the heading angle information. Processor 116 determines a position for the combiner, according to the deviation, such that pilot 130 (FIG. 2B) of aircraft 132 (FIG. 2B) is able to view the projected image aligned with scenery of interest on the combiner (e.g. runway 126 (FIG. 2B)). Processor 116 then directs combiner actuator 120 to move combiner 122 to the determined position. Moving a combiner according to the disclosed technique may include a spatial angular rotation and a spatial linear displacement. Moving a combiner according to the disclosed technique with respect to a heading of an aircraft, and such that a pilot of the aircraft is able to view a projected image aligned with scenery of interest on the combiner is herein below referred to as "alignment of the combiner."

A horizontal axis of a combiner, which is positioned in the combiner default position, is herein below referred to as "combiner default horizontal axis." The angle between a combiner default horizontal axis and a horizontal axis of the combiner is herein below referred to as "horizontal combiner tilt angle." Movement of combiner 122 according to the heading angle information includes tilting combiner 122, by changing the horizontal combiner tilt angle $\beta$ (FIG. 2B).

Processor 116 directs projector 114 to project the image on aligned combiner 122 with respect to the spatial position of combiner 122. Processor 116 may be a processor of a mission computer (not shown) or a flight management computer (not shown). Processor 116 may alternatively be a separate processor, not related to any existing processor on board the aircraft. Processor 116 is coupled with combiner actuator 120, heading angle sensor 118 and with projector 114 by a physical link (not shown). Alternatively, processor 116 is coupled with combiner actuator 120, heading angle sensor 118 and with projector 115 by a wireless link.

With reference to FIG. 2B, during landing of aircraft 132 on a runway 126, a pilot 130 maintains heading vector 142 substantially in line with an approach line 148 of runway 126. Longitudinal axis 128 of aircraft 132 is shifted to the right relative to heading vector 142 due to a side wind, indicated by arrows 136, blowing toward the aircraft, from left of the aircraft. In order to allow pilot 130 to view the image which projector 114 projects on combiner 122 superimposed on the relevant view of runway 126, it is necessary to align combiner 122 with heading vector 142. The alignment of combiner 122 includes tilting combiner 122 to the left yielding a horizontal combiner tilt angle $\beta$. The aligned position of combiner 122 aligns the reflection of the projected image toward pilot 130, with the scene image of runway 126.

In order to exclude turning over the combiner, the combiner horizontal tilt angle is generally substantially between 0° to 90°. However, in a system similar to the system of the disclosed technique, there is no need for the combiner horizontal tilt angle to exceed half of horizontal heading angle $\alpha$. Due to known optical effects, a combiner horizontal tilt angle of substantially up to $\alpha/2$, would be sufficient in order to allow the pilot to view the projected image superimposed on a relevant scene heading the aircraft, e.g., a runway. Therefore, the combiner horizontal tilt angle is substantially between 0° and half of the horizontal heading angle.

Figure 3A:
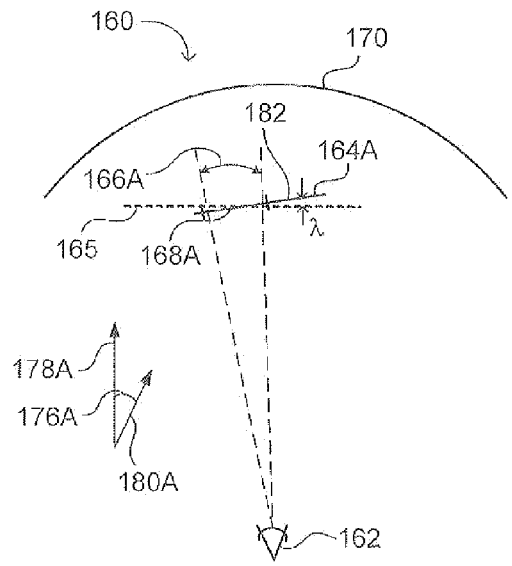
FIG. 3A is a schematic illustration of horizontal cross sections of a pilot's instantaneous field of view (IFOV), while using a moveable combiner HUD system, in which the combiner is tilted to the left, constructed and operative in accordance with another embodiment of the disclosed technique.
Figure 3B:
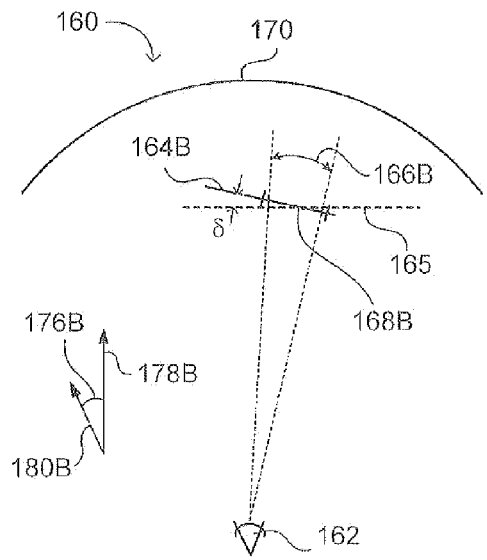
FIG. 3B is a schematic illustration of a horizontal cross section of a pilot's IFOV, while using the HUD system of FIG. 3A, in which the combiner is tilted to the right.
Figure 3C:
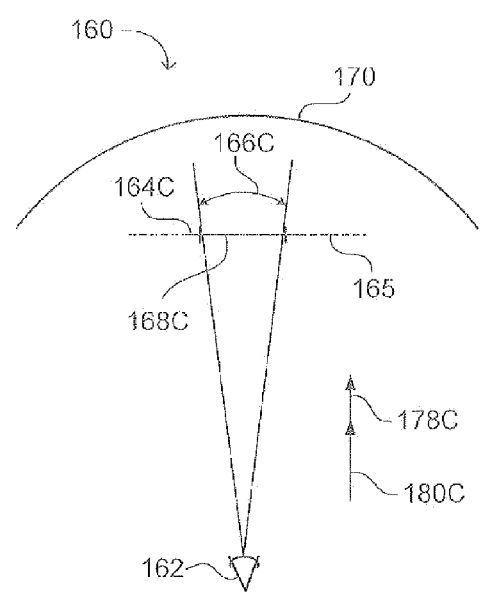
FIG. 3C is a schematic illustration of horizontal cross sections of a pilot's IFOV, while using the HUD system of FIG. 3A, in which the combiner is positioned in the default combiner position.
Figure 3D:
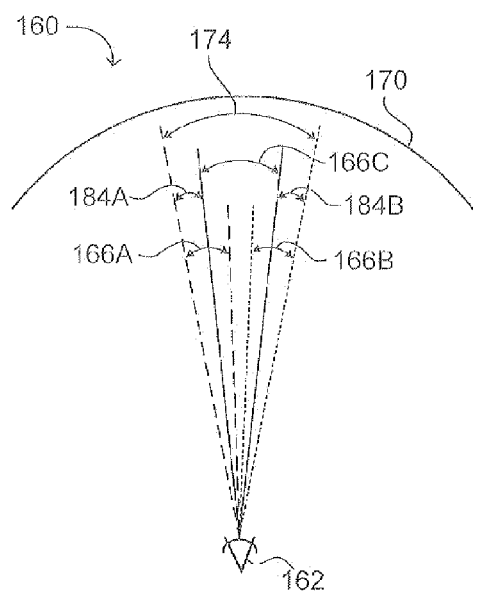
FIG. 3D is a schematic illustration of a horizontal cross section of a pilot's total field of view (TFOV), while using the HUD system of FIG. 3A.

Reference is now made to FIGS. 3A, 3B, 3C and 3D. FIG. 3A is a schematic illustration of horizontal cross sections of a pilot's instantaneous field of view (IFOV), while using a moveable combiner HUD system, generally referenced 160, in which the combiner is positioned with a tilt to the left, constructed and operative in accordance with another embodiment of the disclosed technique. FIG. 3B is a schematic illustration of a horizontal cross section of a pilot's IFOV, while using the system of FIG. 3A and looking at a right tilted combiner. FIG. 3C is a schematic illustration of horizontal cross sections of a pilot's IFOV, while using the system of FIG. 3A and looking at a combiner positioned in the default combiner position. FIG. 3D is a schematic illustration of a horizontal cross section of a pilot's total field of view (TFOV), while using the system of FIG. 3A.

System 160 includes a projector (not shown), a combiner 182, a combiner actuator (i.e., a moving mechanism, not shown) and a processor (not shown). System 160 is further coupled with a heading angle sensor (not shown) of an aircraft. System 160 is generally similar to system 100 of FIGS. 2A and 2B.

Referring now to FIG. 3A, aircraft 170 is progressing in the direction of a heading vector 178A. Arrow 180A represents direction of a longitudinal axis (not shown) of aircraft 170. Therefore aircraft 170 is horizontally tilted to the right with respect to heading vector 178A, yielding a horizontal heading angle 176A.

The term "effective combiner area" herein below, refers to an area of a surface of a combiner, onto which a projector projects an image. The effective combiner area corresponds to the position of the combiner. The field of view (FOV) of a pilot in the context of the disclosed technique refers to the section of the field of view of the pilot, which intersects the effective combiner area. Since the position of a combiner may change in time, than the effective combiner area, and following that, the field of view of the pilot, generally changes in time. Therefore, a field of view of a pilot in a specific instance, referring to a specific combiner position, is herein below referred to as Instantaneous field of view (IFOV).

A pilot 162 flying aircraft 170 looks at a combiner 182. Due to horizontal heading angle 176A, combiner 182 is repositioned at combiner position 164A. The repositioning of combiner 182 includes tilting combiner 182 to the left with respect to a combiner default horizontal axis 165 of combiner 182, yielding a combiner horizontal tilt angle λ. Effective combiner area 168A corresponds to combiner position 164A. While combiner 182 is positioned in combiner position 164A, the projector of system 160 projects an image (not shown) onto effective combiner area 168A. A horizontal angle of IFOV 166A of pilot 162 corresponds to effective combiner area 168A. Angle 166A is the horizontal angle of the IFOV of pilot 162 while looking at combiner 182 positioned in combiner position 164A.

Referring now to FIG. 3B, aircraft 170 is progressing in the direction of a heading vector 178B. Arrow 180B represents direction of a longitudinal axis of aircraft 170. Therefore aircraft 170 is horizontally tilted to the left with respect to heading vector 178B, yielding a horizontal heading angle 176B. A pilot 162 flying aircraft 170 looks at a combiner 182. Due to horizontal heading angle 176B, combiner 182 is repositioned to combiner position 164B. The repositioning of combiner 182 includes tilting combiner 182 to the right with respect to combiner default horizontal axis 165, yielding a combiner horizontal tilt angle δ. Effective combiner area 168B corresponds to combiner position 164B. While combiner 182 is positioned in combiner position 164B, the projector of system 160 projects an image (not shown) onto effective combiner area 168B. A horizontal angle of IFOV 166A of pilot 162 corresponds to effective combiner area 168A respectively. Horizontal angle 166B is the angle of the IFOV of pilot 162 while looking at combiner 182 positioned in combiner position 164B.

Referring now to FIG. 3C, longitudinal axis 180C of aircraft 170, is substantially inline with a heading vector 178C of aircraft 170. Therefore the horizontal combiner tilt angle (not shown) equals zero and a horizontal axis of combiner 182 is inline with the default combiner horizontal axis 165. Consequently, combiner 182 is positioned in the combiner default position. Horizontal IFOV angle 166C of pilot 162 corresponds to effective combiner area 168C. Horizontal angle 166C is the angle of the IFOV of pilot 162 while looking at combiner 182 positioned in the default combiner position 164C.

Referring now to FIG. 3D, horizontal angle 174 is an angle of a field of view which equals the superposition of the angles of IFOVs 166A, 166B and 166C. The superposition of all possible IFOV's of a pilot of an aircraft carrying a system similar to the system of the disclosed technique is herein below referred to as the "Total Field of View" (TFOV). When combiner position 164A (FIG. 3A) corresponds to the maximum horizontal combiner left tilt allowed by system 160, and combiner position 164B (FIG. 3B) corresponds to the maximum horizontal combiner right tilt allowed by system 160, angle 174 is the angle of the TFOV of pilot 162, which is provided by system 160.

With reference to FIG. 3C, if combiner 182 is a fixed combiner, similar to prior art combiners, positioned in the default combiner position, than angle 166C represents the angle of the IFOV and the angle of the TFOV of pilot 162 (i.e., IFOV=TFOV). With reference to FIG. 3D, system 160 provides a TFOV which includes the horizontal IFOV angle 166C of the default combiner position (which generally equals the TFOV of prior art systems), as well as a left horizontal angle 184A and a right horizontal angle 184B. Hence, a HUD system according to the disclosed technique provides a wider TFOV than a fixed combiner HUD system (i.e., TFOV>IFOV).

For example, when the horizontal IFOV angle of a pilot in an aircraft is approximately 20°, a system according to the present disclosure can provide a horizontal TFOV angle of about 30°, enabling a pilot of an aircraft to fly the aircraft properly and safely in various flying conditions. A horizontal TFOV angle of about 30° is acquired by allowing a horizontal combiner tilt angle of 2.5° to each side, thereby adding 5° to each side.

It is noted, that in order to allow alignment of a moveable combiner of a system according to the disclosed technique, with respect to a horizontal heading angle γ, the horizontal tilt angle may be smaller than γ/2. When the IFOV angle is indicated by 0, the horizontal tilt angle τ may be τ=(γ−c*0)/2, where c represents a factor, smaller than 1 (i.e., c≦1). That is, in case the horizontal heading angle γ is smaller than, for example, 0/2, a scenery of interest is likely to be still within the horizontal IFOV of the pilot, and therefore there is yet no need for repositioning of the combiner. Furthermore, one may determine a cutoff value for repositioning a moveable combiner, for example, 0/2.

Figure 4C:
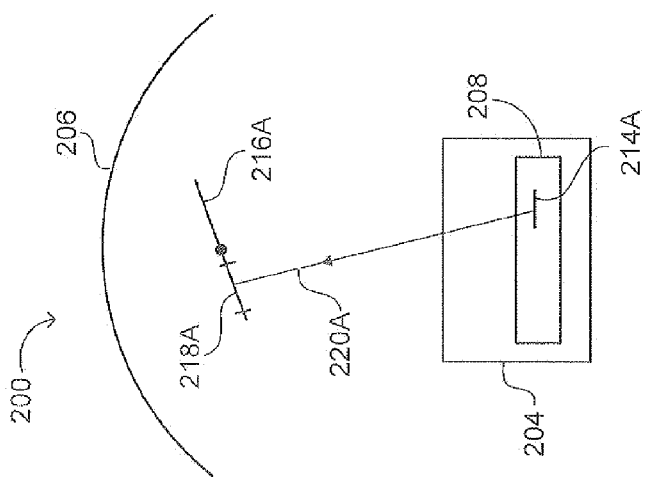
FIG. 4C is a schematic illustration of horizontal cross sections of the system of FIG. 4A, in which the combiner is tilted to the left with respect to the default combiner position.
Figure 4B:
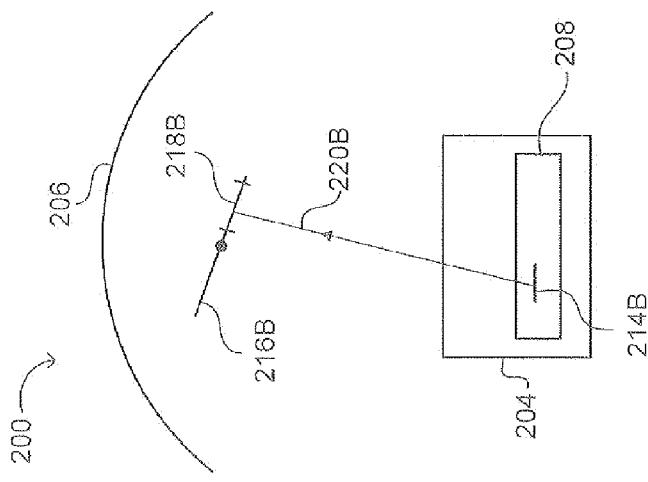
FIG. 4B is a schematic illustration of horizontal cross sections of the system of FIG. 4A, in which the combiner is tilted to the right with respect to the default combiner position.
Figure 4A:
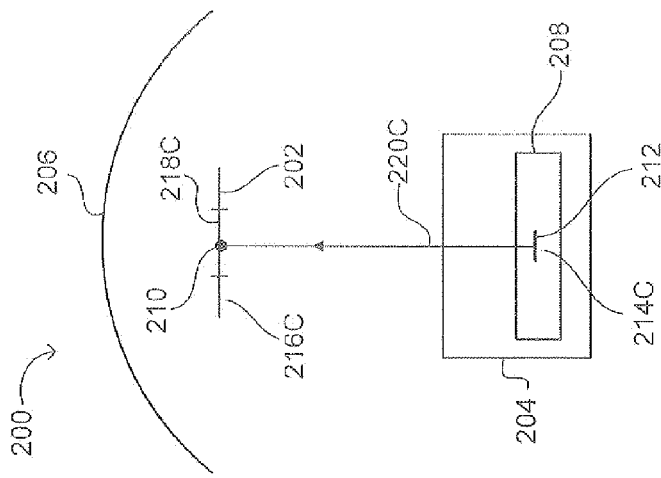
FIG. 4A is a schematic illustration of horizontal cross sections of a tilting combiner HUD system, in which the combiner is positioned in the default position, constructed and operative in accordance with a further embodiment of the disclosed technique.

Reference is now made to FIGS. 4A, 4B and 4C. FIG. 4A is a schematic illustration of horizontal cross sections of a tilting combiner HUD system, generally referenced 200, in which the combiner is positioned in the default position, constructed and operative in accordance with a further embodiment of the disclosed technique. FIG. 4B is a schematic illustration of horizontal cross sections of the system of FIG. 4A, in which the combiner is tilted to the right with respect to the default combiner position. FIG. 4C is a schematic illustration of horizontal cross sections of the system of FIG. 4A, in which the combiner is tilted to the left with respect to the default combiner position.

HUD system 200 includes a projector 204, a tilting combiner 202, a processor (not shown), and a combiner actuator (i.e., moving mechanism, not shown). System 200 is further coupled with a heading angle sensor (not shown), of the aircraft. Projector 204 includes image source 208 and an optical assembly (not shown). System 200 is generally similar to system 100 of FIGS. 2A and 2B. Image source 208 is adjusted to generate an image 212 at a plurality of locations on the surface thereof.

With reference to FIG. 4A, tilting combiner 202 is positioned in the default combiner position 216C. Therefore the combiner horizontal tilt angle (not shown) equals zero. Combiner 202 may be titled about a horizontal tilting axis 210. Horizontal tilting axis 210 is substantially perpendicular to a horizontal axis (not shown) of combiner 202 and preferably, but not limited to, located at the middle of a horizontal dimension of combiner 202. Image source 208 generates image 212 at an image location 214C thereon. Image location 214C of image 212 corresponds to default combiner position 216C. The location of an image on an Image source corresponding to a default combiner position is hereinafter referred to as "default image location." Hence, image location 214C is the default image location. Projector 204 projects image 212 onto combiner 202 by a plurality of beams of lights, which are emitted from image 212, pass through the optical assembly and impinge on the surface of combiner 202. An effective combiner area 218C corresponds to image location 214C. Thus, image 212 is projected from image location 214C, onto an effective combiner area 218C by beams of light 220C.

Since a heading angle (not shown) of an aircraft 206 equals zero (according to data received from the heading angle sensor), combiner 202, positioned in the default combiner position 218C, is horizontally facing the heading scenery of aircraft 206. Therefore, default effective combiner area 218C is preferably centralized with respect to a horizontal dimension of combiner 202. Accordingly, default image location 214C is preferably centralized with respect to a horizontal dimension of image source 208.

With reference to FIG. 4B, tilting combiner 202 is tilted about horizontal tilting axis 210 to the right with respect to default combiner position 216C (FIG. 4A), and positioned in a combiner position 216B. Image source 208 generates image 212 at an image location 214B on image source 208. Image location 214B corresponds to combiner position 216B. Image 212 located at image location 214B is projected onto effective combiner area 218B by beams of light 220B. Effective combiner area 218B corresponds to image location 214B.

A longitudinal axis (not shown) of aircraft 206 is now horizontally tilted to the left with respect to the heading vector (not shown) of aircraft 206. Therefore, effective combiner area 218B is horizontally shifted to the right with respect to horizontal dimensions of combiner 202, in comparison with the default effective combiner area 218C (FIG. 4A). Accordingly, image location 214B is horizontally shifted to the left with respect to horizontal dimensions of image source 208, in comparison with the default image location 214C (FIG. 4A).

With reference to FIG. 4C, tilting combiner 202 is tilted about horizontal tilting axis 210 to the left with respect to default combiner position 216C (FIG. 4A) and positioned in a combiner position 216A. Image source 208 generates image 212 at an image location 214A on image source 208. Image location 214A corresponds to combiner position 216A. Image 212 located at image location 214A is projected onto effective combiner area 218A by beams of light 220A. Effective combiner area 218A corresponds to image location 214A.

A longitudinal axis (not shown) of aircraft 206 is now horizontally tilted to the right with respect to the heading vector (not shown) of aircraft 206. Therefore, effective combiner area 218A is horizontally shifted to the left with respect to the default effective combiner area 218C (FIG. 4A). Respectively, image location 214A is horizontally shifted to the right with respect to default image location 214C (FIG. 4A).

It is noted, that although in FIGS. 4A, 4B and 4C, light beams 220C, 220B and 220A are depicted as straight lines, light beams 220C, 220B and 220A may travel through a different path than a straight line. It is further noted, that the repositioning of tilted combiner 202 may also include a displacement in a vertical plane of aircraft 206 and an additional horizontal shift. In the embodiment depicted in FIGS. 4A, 4B and 4C, the combiner actuator is a moving mechanism, which may be a rotary actuator, for tilting combiner 202 about an axis of rotation.

It is noted that tilting combiner 202 requires horizontal dimensions which are substantially larger than the horizontal dimensions of its default effective combiner area 218C (FIG. 4A), That is, in order to allow a right and a left horizontal shift of the effective combiner area corresponding to a right and a left horizontal tilt of tilting combiner 202, respectively (FIGS. 4B and 4C). It is further noted, that a horizontal shift of tilting combiner 202 may decrease or eliminate the need for enlarging the horizontal dimensions of a tilting combiner according to the disclosed technique.

Figure 5C:
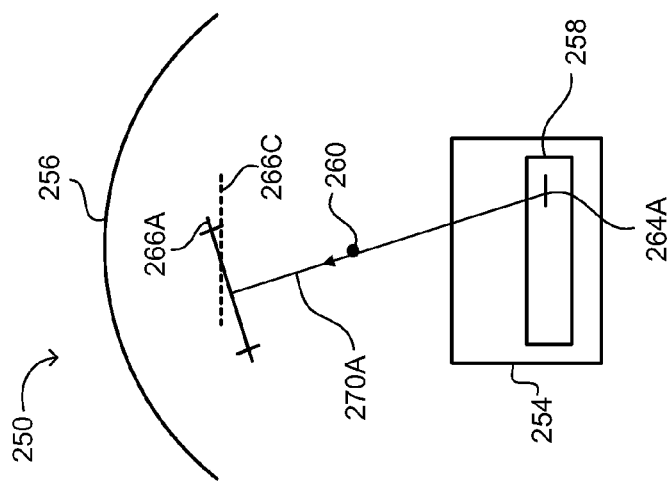
FIG. 5C is a schematic illustration of horizontal cross sections of the system of FIG. 5A, in which the combiner is tilted to the left with respect to the default combiner position.
Figure 5B:
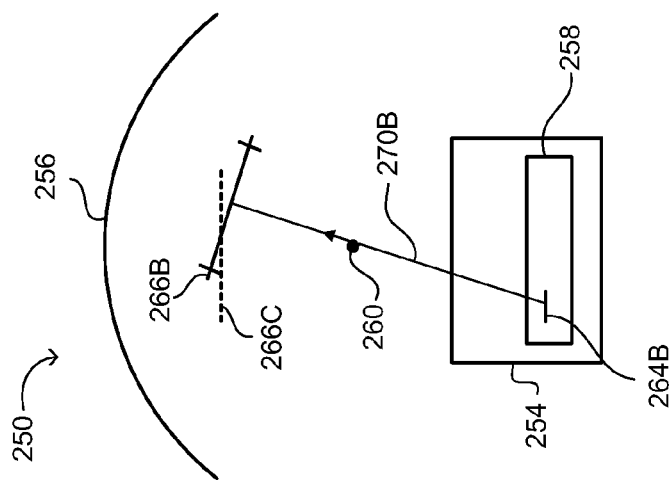
FIG. 5B is a schematic illustration of horizontal cross sections of the system of FIG. 5A, in which the combiner is displaced to the right with respect to the default combiner position.
Figure 5A:
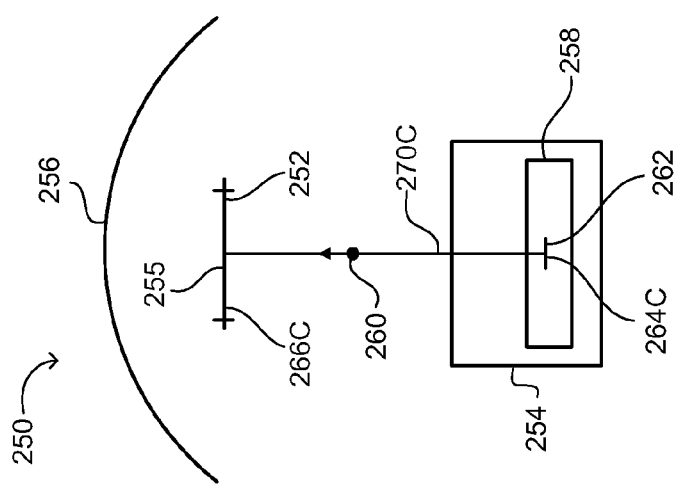
FIG. 5A is a schematic illustration of horizontal cross sections of a tilting combiner HUD system, in which the combiner is positioned in the default position, constructed and operative in accordance with another embodiment of the disclosed technique.

Reference is now made to FIGS. 5A, 5B and 5C. FIG. 5A is a schematic illustration of horizontal cross sections of a rotating combiner HUD system, generally referenced 250, in which the combiner is positioned in the default position, constructed and operative in accordance with another embodiment of the disclosed technique. FIG. 5B is a schematic illustration of horizontal cross sections of the system of FIG. 5A, in which the combiner is rotated to the right with respect to the default combiner position. FIG. 5C is a schematic illustration of horizontal cross sections of the system of FIG. 5A, in which the combiner is rotated to the left with respect to the default combiner position.

HUD system 250 includes a projector 254, a rotating combiner 252, a processor (not shown), and a combiner actuator (i.e., moving mechanism, not shown). System 250 is further coupled with a heading angle sensor (not shown), of aircraft 256. Projector 254 includes image source 258 and an optical assembly (not shown). System 250 is generally similar to system 200 of FIGS. 4A, 4B and 4C. Rotating combiner 252 is horizontally rotated about a horizontal-rotation axis 260. A horizontal-rotation axis according to the disclosed technique is substantially perpendicular to a horizontal plane of an aircraft and does not necessarily intersect with a rotating combiner. Horizontal-rotation axis 260 is located between rotating combiner 252 and a pilot (not shown) of aircraft 256. Rotation of rotating combiner 252 about horizontal-rotation axis 260, which does not intersect with rotating combiner 252, generates a horizontal tilt and a horizontal shift of rotating combiner 252.

With reference to FIG. 5A, rotating combiner 252 is positioned in the default combiner position 266C. Therefore the combiner horizontal tilt angle (not shown) equals zero.

Image source 258 generates an image 262 at an image location 264C thereon. Image location 264C of image 262 corresponds to default combiner position 266C. The location of an image on a surface of an Image source corresponding to a default combiner position is hereinafter referred to as "default image location". Hence, image location 264C is the default image location. Projector 254 projects image 262 onto rotating combiner 252 by a plurality of beams of lights, which are emitted from image 262, pass through the optical assembly and impinge on the surface of rotating combiner 252. Effective combiner area 255 corresponds to image location 264C. Thus, image 262 is projected from image location 264C, onto effective combiner area 255 by beams of light 270C. It is noted, that the horizontal dimension of the effective combiner area is substantially similar to the horizontal dimension of the surface of the combiner, and remains the same throughout any repositioning of the combiner, in the current embodiment.

As the heading angle (not shown) of aircraft 256 equals zero in the default combiner position 266C, rotating combiner 252 is positioned inline with a heading scenery of aircraft 256. Therefore, the effective combiner area is preferably centralized with respect to a horizontal dimension of rotating combiner 252. Accordingly, image location 264C is preferably centralized with respect to a horizontal dimension of image source 258.

With reference to FIG. 5B, rotating combiner 252 is displaced about horizontal-rotation axis 260 to the right with respect to default combiner position 266C (FIG. 5A), and positioned in a combiner position 266B. The rotation of rotating combiner 252 about horizontal-rotation axis 260 includes tilting as well as right shift of rotating combiner 252. Image source 258 generates image 262 at an image location 264B on the surface of image source 258. Image location 264B corresponds to combiner position 266B. Image 262 located at image location 264B is projected onto effective combiner area 255 by beams of light 270B. A longitudinal axis (not shown) of aircraft 256 is now horizontally tilted to the left with respect to the heading vector (not shown) of aircraft 256. The horizontal right shift of rotating combiner 252, caused by the right rotation of rotating combiner 252, substantially eliminates the need for shifting the effective combiner area. Hence, the effective combiner area of rotating combiner 252 positioned in combiner position 266B still remains effective combiner area 255. Image location 264B is horizontally shifted to the left with respect to default image location 264C.

With reference to FIG. 5C, rotating combiner 252 is rotated about horizontal-rotation axis 260 to the left with respect to default combiner position 266C (FIG. 5A) and positioned in a combiner position 266A. Image source 258 generates image 262 at an image location 264A on the surface of image source 258. Image location 264A corresponds to combiner position 266A. Image 262 located at image location 264A is projected onto effective combiner 255 area by beams of light 270A.

A longitudinal axis (not shown) of aircraft 256 is now horizontally tilted to the right with respect to the heading vector (not shown) of aircraft 256. Due to the horizontal left shift of rotating combiner 252, effective combiner area 255 remains the same. Image location 264A is horizontally shifted to the right with respect to default image location 264C (FIG. 5A).

In the embodiment depicted in FIGS. 5A, 5B and 5C, the combiner actuator may be an extending rotating arm or an angular rail, for rotating combiner 252 along an angular path, having an axis of horizontal rotation. It is noted that a combiner according to the disclosed technique, which may be horizontally shifted, may still require different effective combiner areas at different combiner positions, and therefore larger horizontal dimensions. However, a horizontally shifting combiner may require smaller horizontal dimensions, as opposed to a combiner which may not be horizontally shifted. It is further noted, that the repositioning of rotating combiner 252 may also include a displacement in a vertical plane of aircraft 256 (e.g., rotation axis which intersects but not parallel to a horizontal plane of an aircraft).

According to another aspect of the disclosed technique, the processor directs the combiner actuator to move the combiner to a selected position, and directs the projector actuator to move the projector to a position which corresponds to the new combiner position. Reference is now made to FIG. 6, which is a schematic illustration of a HUD system, generally referenced 300, constructed and operative in accordance with a further embodiment of the disclosed technique. System 300 includes a projector 312, a processor 308, a combiner actuator 304, a combiner 302 and a projector actuator 310. System 300 is further coupled with a heading angle sensor 306. Projector 312 includes an image source and an optical assembly (both not shown). Processor 308 is coupled with heading angle sensor 306, projector 312, combiner actuator 304, and with projector actuator 310. Combiner actuator 304 is further coupled with combiner 302. Projector actuator 310 is further coupled with projector 312. System 300 is similar to system 100 (FIG. 2A), except that system 300 further includes projector actuator 310. It is noted, that processor 308 may be a processor mounted on the aircraft, with which system 300 is coupled.

Projector actuator 310 is a moving mechanism operative to receive commands from processor 308 and translate the commands to spatial movements. Projector 308 is adjusted to be spatially repositioned by projector actuator 310. Processor 308 determines the deviation of the heading of the aircraft from the longitudinal axis of the aircraft, according to the heading angle information. Processor 308 receives heading angle information from heading angle sensor 306, and directs combiner actuator 304 to align combiner 302 according to the heading angle deviation. Processor 308 further directs projector actuator 310 to reposition projector 312 according to a selected position of combiner 302. In addition, processor 308 directs projector 312 to project the image generated by the image source onto aligned combiner 302.

Reference is now made to FIG. 7, which is a schematic illustration of a moveable HUD system, generally referenced 330, constructed and operative in accordance with another embodiment of the disclosed technique. System 330 includes a moveable projector 334, a projector actuator (i.e., a moving mechanism, not shown), a moveable combiner 332, a combiner actuator (i.e., a moving mechanism, not shown) and a processor (not shown). System 330 is further coupled to a heading angle sensor (not shown). System 330 is generally similar to system 300 of FIG. 6.

Moveable combiner 332 is illustrated in a plurality of selected combiner positions 340A and 340C. Moveable projector 312 is illustrated in a plurality of selected projector positions 342A, and 342C. Combiner positions 340A, and 340C, correspond to projector positions 342A, and 342C, respectively. The optical assembly (not shown) of moveable projector 334 directs a plurality of beams of light emitted from the surface of the image source (not shown) of moveable projector 334, such as beams of light 338A and 338C, toward combiner 302. These beams of light represent an image generated by the image source.

When moveable projector 334 is positioned at projector position 342A, it projects beams of light 338A toward moveable combiner 332 positioned in combiner position 340A. Similarly, when moveable projector 334 is positioned at projector position 342C, it projects beams of light 338C toward moveable combiner 332 positioned at combiner position 340C. When the processor directs the combiner actuator to move moveable combiner 332 to position 340A, the processor further directs the projector actuator to move moveable projector 334 to projector position 342A. Similarly, when the processor directs the combiner actuator to move moveable combiner 332 to position 340C, the processor further directs the projector actuator to move moveable projector 334 to projector position 342C.

It is noted, that a projector actuator according to the disclosed technique may spatially reposition a moveable projector as a whole, or spatially reposition one or more of the components of the moveable projector conjointly or separately. For example, the projector actuator may spatially reposition the image source or spatially reposition components of the optical assembly, such as lenses (not shown). In case only some components of the moveable projector (one or more, but not all) are spatially repositioned, the spatial reposition may require further adjustments to the non-movable components of the moveable projector, (e.g., larger optics, in order to maintain adequate image projection on the aligned combiner).

Reference is now made to FIGS. 8A and 8B. FIG. 8A is a schematic illustration of a side view of a moveable HUD system, generally referenced 360, constructed and operative in accordance with a further embodiment of the disclosed technique. FIG. 8B is a schematic illustration of a horizontal cross-section of the system of FIG. 8A.

System 360 includes a moveable projector 362, a moveable combiner 364, a common actuator (i.e., a moving mechanism, not shown) and a processor. System 360 is further coupled with a heading angle sensor (not shown) provided aboard an aircraft. Moveable projector 362 includes an image source (not shown) and an optical assembly (not shown). The processor is coupled with the common actuator, moveable projector 362 and with the heading angle sensor. The common actuator is coupled with moveable projector 362 and with moveable combiner 364. Moveable projector 362 is further coupled with moveable combiner 364. The common actuator may be coupled only to moveable projector 362 or only to moveable combiner 364.

System 360 is generally similar to system 300 of FIG. 6, except that the combiner actuator and the projector actuator of system 300 are integrated to a single common actuator of system 360. Moveable projector 362 and moveable combiner 364 are substantially vertically in line with respect to a vertical plane of aircraft 368. Such substantially vertical alignment of moveable projector 362 with respect to moveable combiner 364, is herein below referred to as "vertical alignment of the projector with the combiner".

Combiner 364 is positioned in the default combiner position 365C (FIG. 8B) with respect to an eye 366 of a pilot 370 (FIG. 8A). The processor receives heading angle information from the heading angle sensor, determines the deviation of the heading of the aircraft from the longitudinal axis of the aircraft, and directs the common actuator to reposition moveable projector 362 and moveable combiner 364 conjointly according to the deviation. With reference to FIG. 8B, moveable combiner 364 is illustrated in a plurality of selected combiner positions 365A and 365C. Moveable projector 362 is illustrated in a plurality of selected projector positions 363A, and 363C. When moveable projector 362 is positioned at each of projector positions 363A and 363C, it maintains the vertical alignment with moveable combiner 364, positioned in the corresponding combiner positions 365A and 365C, respectively. The processor directs the common actuator to move moveable combiner 364 and moveable projector 362 conjointly to combiner position 365A and projector position 363A, respectively. Similarly, the processor directs the common actuator to move moveable combiner 364 and moveable projector 362 conjointly to combiner position 365C and projector position 363C, respectively.

Due to the conjoint spatial movement of a combiner and a projector of a system similar to system 360, repositioning of the combiner does not generally require an adjustment of the projection of an image by the projector on the combiner. It is optional to couple only the optical assembly of the projector with a combiner of a system similar to system 360. In that case, the common actuator repositions only the optical assembly of the projector conjointly with the combiner. Thus, the image source of the projector, which is not coupled with the combiner, remains substantially spatially fixed during the flight of an aircraft.

Figure 9B:
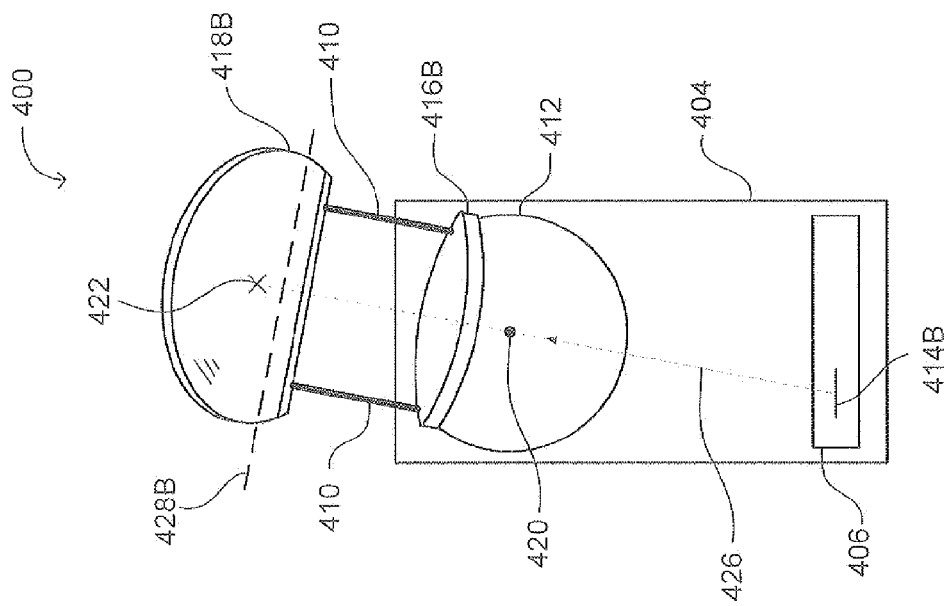
FIG. 9B is a schematic illustration of the HUD system of FIG. 9A, in which the combiner and the optical assembly are displaced clockwise.
Figure 9A:
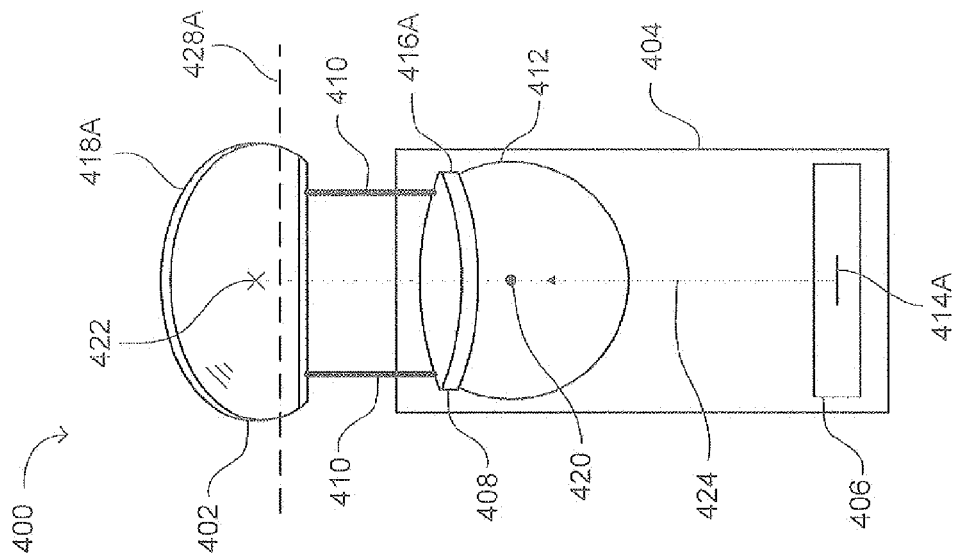
FIG. 9A is a schematic illustration of a HUD system, constructed and operative in accordance with another embodiment of the disclosed technique.

Reference is now made to FIGS. 9A and 9B. FIG. 9A is a schematic illustration of a HUD system, generally referenced 400, constructed and operative in accordance with another embodiment of the disclosed technique. FIG. 9B is a schematic illustration of the HUD system of FIG. 9A, in which the combiner and the optical assembly are displaced clockwise.

HUD 400 includes an optical combiner 402 and a projector 404. Projector 404 further includes an image source 406 and an optical assembly 408. Optical assembly 408 may include optical elements, such as an objective lens. FIGS. 9A and 9B are depicted from a pilot's point of view, the pilot observing combiner 402, such that a pilot's LOS 422 passes through combiner 402. In this manner, the pilot (not shown) may observe images projected onto combiner 402, superimposed with an image of the outside scene. Combiner 402 is firmly coupled with optical assembly 408, for example, through arms 410. Optical assembly 408 is pivotally coupled with the body of projector 404, for example through rotatable circular frame 412, which is rotatable about a rotation axis 420. HUD 400 is installed within an aircraft (not shown). For example, projector 404 may be installed in the front panel (not shown) of the aircraft, such that combiner 402 is located above the panel.

With reference to FIG. 9A, the heading angle of the aircraft is substantially zero, such that combiner 402 is positioned at a default position 418A. Optical assembly 408 is positioned at a default position 416A, wherein a horizontal axis thereof (not shown) is substantially parallel to a default horizontal combiner axis 428A. Image source 406 generates an image at a first image location 414A on the surface thereof. First image location 414A is substantially centralized relative to the surface of image source 406. Image source 406 emits a light beam 424 of the generated image, toward optical assembly 408. Optical assembly transmits light beam 424 toward the surface of optical combiner 402. Combiner 402 reflects light beam 424 toward the eyes of the pilot (i.e., in a direction substantially perpendicular to the depicted FIG. 9A).

With reference to FIG. 9B, the heading angle of the aircraft is different than zero, such that the aircraft is angularly shifted counter clockwise. In this case, the LOS of the pilot may fall outside of the surface of combiner 402, rendering HUD 400 inoperative. Thus, combiner 402 and optical assembly 408 are displaced together in a clockwise direction, to combiner position 418B and optical assembly position 416B, respectively. Combiner 402 and optical assembly are firmly coupled together, such that when optical assembly 408 is displaced to position 416B, the horizontal axis thereof remains substantially parallel to the horizontal axis of combiner 402, depicted as tilted combiner axis 428B. Combiner 402 and optical assembly 408 may be displaced by rotating circular frame 412 about axis 420.

Image source 406 generates an image at a second image location 414B on the surface thereof. Second image location 414B is shifted to the left, relative to first image location 414A. Image source 406 emits a light beam 426 of the generated image, toward optical assembly 408, in position 416B. Optical assembly 408 transmits light beam 426 toward the surface of optical combiner 402, in position 418B. Combiner 402 reflects light beam 426 toward the eyes of the pilot. When combiner 402 is displaced to position 418B, LOS 424 passes through combiner 402, as depicted in FIG. 9B. In this manner, the pilot may still observe the projected image superimposed with the outside scene, even when the aircraft is angularly shifted.

Figure 10A:
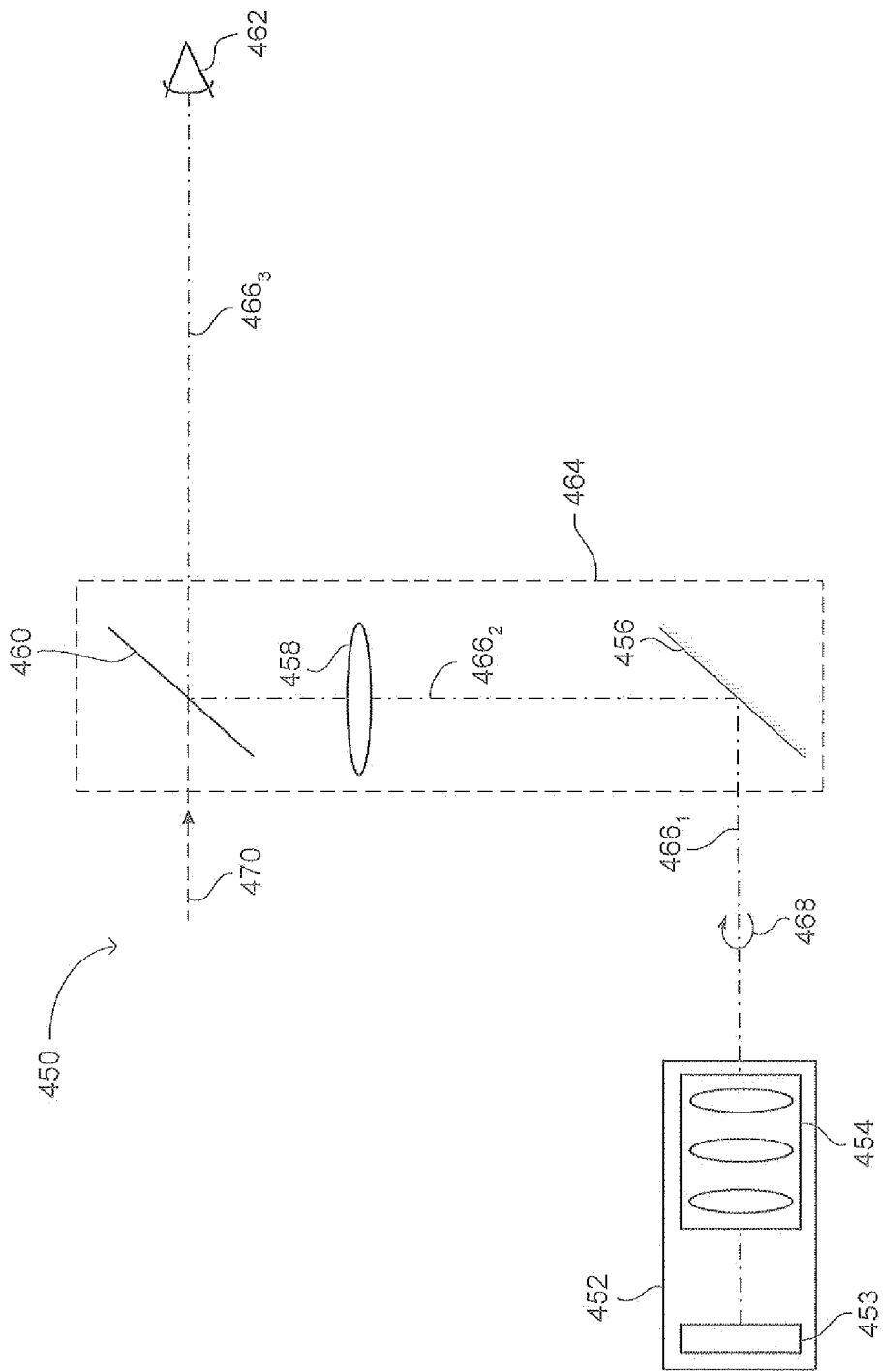
FIG. 10A is a side view schematic illustration of a HUD system, constructed and operative in accordance with another embodiment of the disclosed technique.

According to another embodiment of the disclosed technique, the HUD system may further include a folding mirror for folding the optical axis of the system and reflecting the projected image from the projector toward the optical combiner. Reference is now made to FIGS. 10A, 10B and 10C. FIG. 10A is a side view schematic illustration of a HUD system, generally referenced 450, constructed and operative in accordance with another embodiment of the disclosed technique. FIG. 10B is a front view schematic illustration of the HUD system of FIG. 10A. FIG. 10C is a front view schematic illustration of the HUD system of FIG. 10A, in which the combiner, the optical assembly and the folding mirror are rotated clockwise.

HUD 450 includes a projector 452 a folding mirror 456, an exit lens 458 and an optical combiner 460. Projector 452 further includes an image source 453 and an optical relay assembly 454. Optical assembly 454 may include optical elements, such as an objective lens. FIGS. 10B and 10C are depicted from a pilot's point of view, the pilot observing combiner 460, such that a pilot's LOS passes through combiner 460.

HUD 450 is installed within an aircraft (not shown). For example, projector 452 may be installed in the front panel (not shown) of the aircraft, such that combiner 460 is located above the panel. Combiner 460 is firmly coupled with exit lens 458 and with folding mirror 456, all surrounded by dotted line area 464. The elements enclosed within area 464 (i.e., combiner 460, exit lens 458 and folding mirror 456) are rotatable about optical axis 466$_1$, which passes through folding mirror 456.

With reference to FIG. 10B, the heading angle of the aircraft is substantially zero, such that combiner 460 is positioned at a default position 460A. Exit lens 458 is positioned at a default position 458A, wherein a horizontal axis thereof (not shown) is substantially parallel to a default horizontal combiner axis (not shown). Folding mirror 456 is positioned at a default position 456A. Image source 453 generates an image, and emits light beams (not shown) of the generated image toward optical relay assembly 454, along optical axis 466$_1$. Optical assembly 454 transmits the light beams along optical axis 466$_1$ toward the surface of folding mirror 456. Folding mirror 456 reflects the light beams along optical axis 466$_2$ toward exit lens 458, at default position 458A. Exit lens 458 transmits the light beams along optical axis 466$_2$ toward combiner 460, at default position 460A. Combiner 460 reflects the light beams along optical axis 466$_3$ toward an eye 462 of the pilot.

With reference to FIG. 10C, the heading angle of the aircraft is different than zero, such that the aircraft is angularly shifted counter clockwise. In this case, the LOS of the pilot may fall outside of the surface of combiner 460, rendering HUD 450 inoperative. Thus, combiner 460, exit lens 458 and folding mirror 456 are displaced together in a clockwise direction, to combiner position 460B, lens position 458B and mirror position 456B, respectively. Combiner 460, exit lens 458 and folding mirror 456 are firmly coupled together, such that when exit lens 458 is displaced to position 458B, the horizontal axis thereof remains substantially parallel to the horizontal axis of combiner 460. Furthermore, since combiner 460 and folding mirror 456 are moved together, the optical relation between them does not change, such that folding mirror 456 in mirror position 456B still reflects the light beams on optical axis 466$_1$, toward combiner 460 in combiner position 460B. Combiner 460 still reflects the light beams toward eye 462 of the pilot. When combiner 460 is displaced to position 460B, the LOS of the pilot passes through combiner 460. In this manner, the pilot may still observe the projected image superimposed with the outside scene (indicated by light beam 470 in FIG. 10A), even when the aircraft is angularly shifted. It is noted, that projector 452 remains in the same position when combiner 460 is repositioned, thus projector 452 is depicted in the same position in FIGS. 10B and 10C).

It is further noted, that known optical compensation methods (e.g., reverse distortion software) are to be employed in a HUD system according to the disclosed technique in order to compensate for optical distortions. Optical distortions may occur in an image projected to an eye of a pilot, due to spatial movements of a combiner and of an image generated on the surface of an image source.

It will be appreciated by persons skilled in the art that the disclosed technique is not limited to what has been particularly shown and described hereinabove. Rather the scope of the disclosed technique is defined only by the claims, which follow.

The invention claimed is:

1. A head-up display scenery alignment system, said head-up display being mounted in an aircraft and including an image projector and a combiner, the combiner optically located between a user and a scenery of interest, optically transmitting a scene image of the scenery of interest to the user, the image projector projecting an image toward the combiner, the combiner reflecting the image toward the user, the aircraft including a heading angle sensor, determining the heading angle of the aircraft, the HUD scenery alignment system comprising:
   a moving mechanism coupled with said combiner; and
   a processor coupled with said heading angle sensor, with said moving mechanism and with said projector, said processor receiving heading angle information from said heading angle sensor, said processor determining the deviation of the heading of the aircraft from the longitudinal axis of the aircraft according to said heading angle information,
   wherein said processor directs said moving mechanism, according to said deviation, to move said combiner to a position which is located between said scenery of interest and said user and which aligns the reflection of said image toward said user, with said scene image.

2. The system according to claim 1, further comprising:
   a folding mirror optically located between said projector and said optical combiner for reflecting said image from said projector toward said combiner.

3. The system according to claim 2, wherein said optical combiner is firmly coupled with said folding mirror, said moving mechanism moving said folding mirror along with said combiner.

4. The system according to claim 2, further comprising:
   an exit lens optically located between said folding mirror and said optical combiner for transmitting light beams of said image from said folding mirror toward said optical combiner.

5. The system of claim 1, wherein said projector further includes an image source and an optical assembly, said image source emits light beams of said image toward said optical assembly, for projecting said image.

6. The system according to claim 5, wherein said processor directs said image source to emit said light beams from a predetermined area of said image source, when said combiner is positioned at a position corresponding to said predetermined area, said processor directing said image source to emit said light beams from another area of said image source, when said combiner is positioned at a position corresponding to said other area.

7. The system according to claim 1, wherein said moving mechanism moves said combiner in a horizontal tilt with respect to a horizontal plane of said aircraft.

8. The system according to claim 7, wherein said horizontal tilt of said combiner is about a tilt axis, said tilt axis intersecting a horizontal plane of said aircraft.

9. The system according to claim 8, wherein said tilt axis further intersects the surface of said combiner.

10. The system according to claim 1, wherein said moving mechanism moves said combiner in a horizontal shift with respect to a horizontal plane of said aircraft.

11. The system according to claim 1, further comprising:

a projector actuator coupled with said image projector, said processor directs said projector actuator to move said projector, according to the aligned position of said combiner.

* * * * *